United States Patent
LaBosco et al.

(10) Patent No.: US 9,883,046 B1
(45) Date of Patent: Jan. 30, 2018

(54) RETROFIT DIGITAL NETWORK SPEAKER SYSTEM

(71) Applicant: Crestron Electronics, Inc., Rockleigh, NJ (US)

(72) Inventors: Mark LaBosco, New City, NY (US); Alexander Marra, Ridgewood, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/354,211

(22) Filed: Nov. 17, 2016

(51) Int. Cl.
| | | |
|---|---|---|
| *H04M 1/00* | (2006.01) | |
| *H04M 9/00* | (2006.01) | |
| *G10K 11/16* | (2006.01) | |
| *H04M 11/02* | (2006.01) | |
| *H04R 27/00* | (2006.01) | |
| *H04R 29/00* | (2006.01) | |
| *H04L 12/10* | (2006.01) | |
| *H04L 25/02* | (2006.01) | |
| *H04M 1/02* | (2006.01) | |
| *H04L 12/26* | (2006.01) | |
| *H04M 9/08* | (2006.01) | |

(52) U.S. Cl.
CPC .......... *H04M 11/02* (2013.01); *H04L 12/10* (2013.01); *H04L 25/0278* (2013.01); *H04L 43/0888* (2013.01); *H04M 1/0291* (2013.01); *H04M 9/082* (2013.01); *H04R 27/00* (2013.01); *H04R 29/007* (2013.01); *H04M 2201/26* (2013.01); *H04M 2201/30* (2013.01); *H04R 2227/003* (2013.01)

(58) Field of Classification Search
CPC ..... H04B 2203/547; H04B 3/58; H04L 12/10; H04L 12/2885; H04L 12/2989; H04L 12/4005; H04L 41/0833; H04R 27/00; H04R 2201/021; H04R 29/007; H04R 5/04; H04R 2227/003
USPC .... 379/159, 167.02, 167.04, 167.08, 167.14, 379/167.15; 381/55, 56, 77, 95, 111, 381/120, 122, 71.7, 80, 82, 345, 386, 387
See application file for complete search history.

(56) References Cited

U.S. PATENT DOCUMENTS

| | | | | |
|---|---|---|---|---|
| 4,196,314 | A * | 4/1980 | Guillory | H04R 3/12 381/18 |
| 8,385,561 | B2 * | 2/2013 | Merrey | H04B 3/58 381/120 |
| 2003/0219133 | A1 * | 11/2003 | Horrall | G10K 11/175 381/73.1 |
| 2003/0220705 | A1 * | 11/2003 | Ibey | H04R 5/04 700/94 |
| 2004/0220687 | A1 * | 11/2004 | Klotz | H04R 29/007 700/94 |

(Continued)

*Primary Examiner* — Binh K Tieu
(74) *Attorney, Agent, or Firm* — Crestron Electronics, Inc.

(57) ABSTRACT

Described herein is a retrofit digital speaker system comprising two or more retrofitted speaker enclosures, each of the two or more retrofitted speaker enclosures (enclosures) comprising: at least one speaker; and an analog-and-digital interface adapted to receive digitally encoded audio signals, electrical power, and digital command signals, and wherein the digitally encoded audio signals, electrical power, and digital command signals are transmitted over existing two wire analog audio cables, and further wherein the two or more retrofitted speaker enclosures are wired in a daisy chain fashion, via the existing two wire analog audio cables.

41 Claims, 4 Drawing Sheets

(56) References Cited

U.S. PATENT DOCUMENTS

2013/0039527 A1* 2/2013 Jensen .................... H04R 1/24
                                                 381/387
2013/0089210 A1* 4/2013 Martin ................... H04M 9/08
                                                 381/58
2015/0304508 A1* 10/2015 Peker ................ H04M 19/003
                                                 379/24

* cited by examiner

RETROFIT DIGITAL NETWORK SPEAKER SYSTEM

BACKGROUND

Technical Field

The embodiments described herein relate generally to networked speakers and more specifically to systems, methods, and modes for providing a distributed bidirectional-communications network speaker system for the transport of digital audio information.

Background Art

There currently many instances of 70 volt (V) (and 100V) speaker installations that provide for a large number of speakers per amplifier channel and long cable capability. Examples of such installations can includes airport, bus, and train terminals, as well as schools, hospitals, stadiums, government buildings, among many others. FIG. 1 illustrates one such general installation, denoted as known audio distribution system 100 (audio system 100). In audio system 100, there is handheld microphone 102, public address (PA) power supply 104, and wall mounted microphone 104 (either or both of 102, 104 can be used in audio system 100). PA power supply 104 receives as input(s) either or both of the outputs of microphones 102, 106, and a step-up transformer, not shown, can be located internally to step-up the voltage for distribution to speaker 116, which are located in a respective enclosure 118 (note that although only enclosure 118 is shown, in fulfillment of the dual purposes of clarity and brevity, there can be, and typically are, numerous enclosures 118, especially if system 100 is located in a large room, such as a terminal (bus, rail, plane), among other large locations), and each of enclosures 118 includes step-down transformer 114. Cabling 108 (which ostensibly contains at least two wires), connects speaker 116 to amplifier 104, and is generally (though not necessarily) located behind walls 110, and above ceilings 112. Because these types of known audio systems 100 can be used in fairly large buildings, PA power supply 104 might have several, if not a dozen or even more output channels. Different channels can be selected, or a single audio message can be sent to all channels. Following step-down transformer 114 is crossover circuitry 122, which can be a low pass filter (LPF), band-pass filter (BPF), notch filter (NF), or high-pass filter (HPF), depending on the intended frequency response of speaker 116 and frequency content of the audio signal.

In a 70V audio distribution system (e.g., audio system 100), a step-up transformer can be connected to the output of PA power supply 104, and a step-down transformer can be placed at each speaker 116. The output of PA power supply 104 is in effect amplified by the step-up transformer, and the step-down transformer generally maintains the same voltage output, but at some lower power level, thereby providing impedance matching. In general, a 70V distribution audio distribution system only provides for a single audio signal on a given wire and does not provide for return communications or return audio signals.

Because of significant recent improvements in speaker technology, many of users of such 70V/100V audio distribution systems change their speakers; however, there are problems with such "swap-outs." While the speaker design has improved, often times such improvement is dependent upon additional or auxiliary electronics such as digital signal processors, equalizers, and/or amplifiers, among other devices. Without a means for getting power to such remote locations, swapping new speakers for old ones improves the audio, but not as much as expected. In addition, because the existing cabling is "analog" in nature, and not digital, digital processing techniques cannot be utilized. This then leaves the facility managers of such buildings with 70V/100V audio distribution systems with a difficult choice: do they just swap the speakers, and/or run new cabling? The latter is very expensive, and requires entire sections of the building to be down at one time while cumbersome cabling is run through ceilings, walls, or existing cable conduit. The former suffers from the aforementioned problems.

Thus, there are certain problems with the conventional systems, solutions, and devices described above. Accordingly, it would be desirable to provide systems for systems, methods, and modes for providing a distributed bidirectional-communications network speaker system for the transport of digital audio information.

SUMMARY

An object of the embodiments is to substantially solve at least the problems and/or disadvantages discussed above, and to provide at least one or more of the advantages described below.

It is therefore a general aspect of the embodiments to provide systems, methods, and modes for programming a control network and more specifically for programming a control network comprising one or more lighting, shade, and other types of controllable devices that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a retrofit digital speaker system comprising two or more retrofitted speaker enclosures, each of the two or more retrofitted speaker enclosures (enclosures) is provided, the retrofit digital speaker system comprising: at least one speaker; and an analog-and-digital interface adapted to receive digitally encoded audio signals, electrical power, and digital command signals, and wherein the digitally encoded audio signals, electrical power, and digital command signals are transmitted over existing two wire analog audio cables, and further wherein the two or more retrofitted speaker enclosures are wired in a daisy chain fashion, via the existing two wire analog audio cables.

According to the first aspect of the embodiments, the retrofit digital speaker system further comprises a relay in each of the two or more retrofitted speaker enclosures adapted to remain normally open on power-up such that the digitally encoded audio signals, electrical power, and digital command signals received by a first enclosure and relay are not transmitted to a second enclosure unless and until specifically commanded to do so.

According to the first aspect of the embodiments, the retrofit digital speaker system further comprises: a digital signal processor (DSP) adapted to receive and process the digitally encoded audio signals and digital command signals; and a coder-decoder device adapted to receive and decode the digitally encoded audio signals from the DSP to produce output analog audio signals, and is further adapted to receive and encode input analog audio signals from at least one microphone to produce return digital audio signals to be sent to the DSP.

According to the first aspect of the embodiments, the analog-and-digital interface comprises: a power-over-Ethernet (PoE) controller adapted to extract electrical power from the audio cables and direct the electrical power to one or more power supplies; and a coupler circuit adapted to substantially separate all of the electrical power from the digitally encoded audio signals and digital command signals.

According to the first aspect of the embodiments, the coupler circuit comprises at least one of a high pass filter and transformer, and the analog-and-digital interface further comprises a signal conditioner adapted to receive the digitally encoded audio signals and digital command signals and further remove electrical power; an analog front end bi-directional line driver device adapted to provide a substantially matched impedance transmission path between remaining circuitry in the enclosure and the two wire analog audio cable; a media access control/physical layer control (MAC/PHY) device adapted to translate PLC signals to a digital format that can be used for internet protocol (IP) communications, and for translating from an IP protocol format to the PLC-type signals; and an audio processor adapted to receive the digital IP encoded audio signals from the MAC/PHY device and convert them to a pulse code modulation (PCM) format, and to encode PCM formatted digital audio signals into an IP format.

According to the first aspect of the embodiments, the retrofit digital speaker system further comprises: at least one microphone, and wherein the analog-and-digital interface is further adapted to provide a bi-directional communication capabilities through use of the at least one speaker and the at least one microphone.

According to the first aspect of the embodiments, the microphone and other components of the digital network speaker system are adapted to do one or more of (a) determine if an audio signal is being broadcast as intended, (b) determine a quality of the broadcast audio signal (distortion, frequency response, sound pressure levels (SPL)), (c) provide full duplex intercom, (d) perform gunshot detection, (e) perform acoustic echo cancellation, and (f) ambient noise compensation.

According to the first aspect of the embodiments, the retrofit digital speaker system further comprises: a commissioning computer, the commissioning computer including a commissioning software application (App), the App adapted to generate a plurality of commands adapted to generate a first test signal to a first enclosure, measure a data through-put rate in a first path between the commissioning computer and the first enclosure, wherein the first relay remains open, generate a command that closes the first relay, generate a second test signal to the second enclosure, and measure a data throughput rate in a second path between the commissioning computer and the second enclosure through the first enclosure, and subsequently generate additional commands and test signals to discover and measure paths between all of the subsequent enclosures that make up the digital network speaker system.

According to the first aspect of the embodiments, each of the one or more speaker enclosures further comprises: a microphone adapted to receive and convert audible sounds to an analog audio signal, the CODEC adapted to convert the received analog audio signal into a digital audio signal, and wherein the DSP is further adapted to add a time date stamp to the digital audio signal, and wherein the App is adapted to process each of one or more such time date stamped digital audio signals to determine which of a plurality of speaker enclosures first received the analog audio signal.

According to the first aspect of the embodiments, the retrofit digital speaker system further comprises: a battery adapted to provide peak power to the at least one speaker when a received audio signal requires power in excess of the electrical power provided by the two wire analog audio cables.

According to a second aspect of the embodiments, a method for commissioning two or more retrofitted speaker enclosures in a retrofit digital speaker system, is provided herein, the method comprising: daisy-chain connecting each of the two or more retrofitted speaker enclosures using two wire analog audio cables; transmitting digitally encoded audio signals, electrical power, and digital command signals are transmitted over the daisy-chained two wire analog audio cables; and receiving digitally encoded audio signals, electrical power, and digital command signals at an analog-and-digital interface in a first retrofitted speaker enclosure.

According to the second aspect of the embodiments, the method further comprises preventing the received digitally encoded audio signals, electrical power, and digital command signals from being transmitted to a second or subsequent retrofitted speaker enclosure by a normally open relay in series with the two wire daisy-chained analog audio cables.

According to the second aspect of the embodiments, the method further comprises receiving a first command at the first retrofitted speaker enclosure to report an identification number of the first retrofitted speaker enclosure; transmitting a first response to the first command that includes at least the first identification number of the first retrofitted speaker enclosure; receiving a first data path test message at the first retrofitted speaker enclosure; determining a data through-put rate for a first path that comprises the path from a commissioning computer to the first retrofitted speaker enclosure, and storing the same based on the first identification number.

According to the second aspect of the embodiments, the method further comprises receiving a second command at the first retrofitted speaker enclosure to close the normally open relay in series with the two wire daisy-chained analog audio cables; receiving a third command at the second retrofitted speaker enclosure to report an identification number of the second retrofitted speaker enclosure; transmitting a second response to the third command that includes at least the second identification number of the second retrofitted speaker enclosure; receiving a second data path test message at the second retrofitted speaker enclosure; determining a data through-put rate for a second path that comprises the first path plus a path from the first retrofitted speaker enclosure to the second retrofitted speaker enclosure, and storing the same based on the second identification number.

According to the second aspect of the embodiments, the method further comprises repeating the steps of transmitting commands to close normally open relays, determining an identification number of a next subsequent speaker enclosure, determining a respective data throughput rate from the commissioning computer to the next subsequent speaker enclosure, and storing the respective data throughput rate based on the respective retrofitted speaker enclosure identification number until all of the retrofitted speaker enclosures have been tested for their respective data throughput rates.

According to the second aspect of the embodiments, the method further comprises generating a table that lists retrofitted speaker enclosures versus respective data throughput rates; and applying a compression algorithm to the digitally encoded audio signals and digital command signals that increases the compression of the digitally encoded audio signals and digital command signals in direct proportion to the data throughput rate to the respective retrofitted speaker enclosures that the digitally encoded audio signals and digital command signals are being directed to.

According to the second aspect of the embodiments, the method further comprises receiving audio signals by at least one microphone in two or more retrofitted speaker enclosures, and converting the same to an analog audio signal; converting the received analog audio signal into a return digital audio signal; and processing the return digital audio signal to perform one or more of (a) determining if an audio signal is being broadcast as intended, (b) determining a quality of the broadcast audio signal, wherein the quality includes one or more distortion levels, frequency response, and sound pressure levels, (c) providing full duplex intercom, (d) performing gunshot detection, (e) performing acoustic echo cancellation, and (f) performing ambient noise compensation.

According to the second aspect of the embodiments, the method further comprises adding a time-date stamp to the return digital audio signal, such that a commissioning computer can be adapted to determine which of a plurality of retrofitted speaker enclosures first received the analog audio signal.

BRIEF DESCRIPTION OF THE DRAWINGS

The above and other objects and features of the embodiments will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
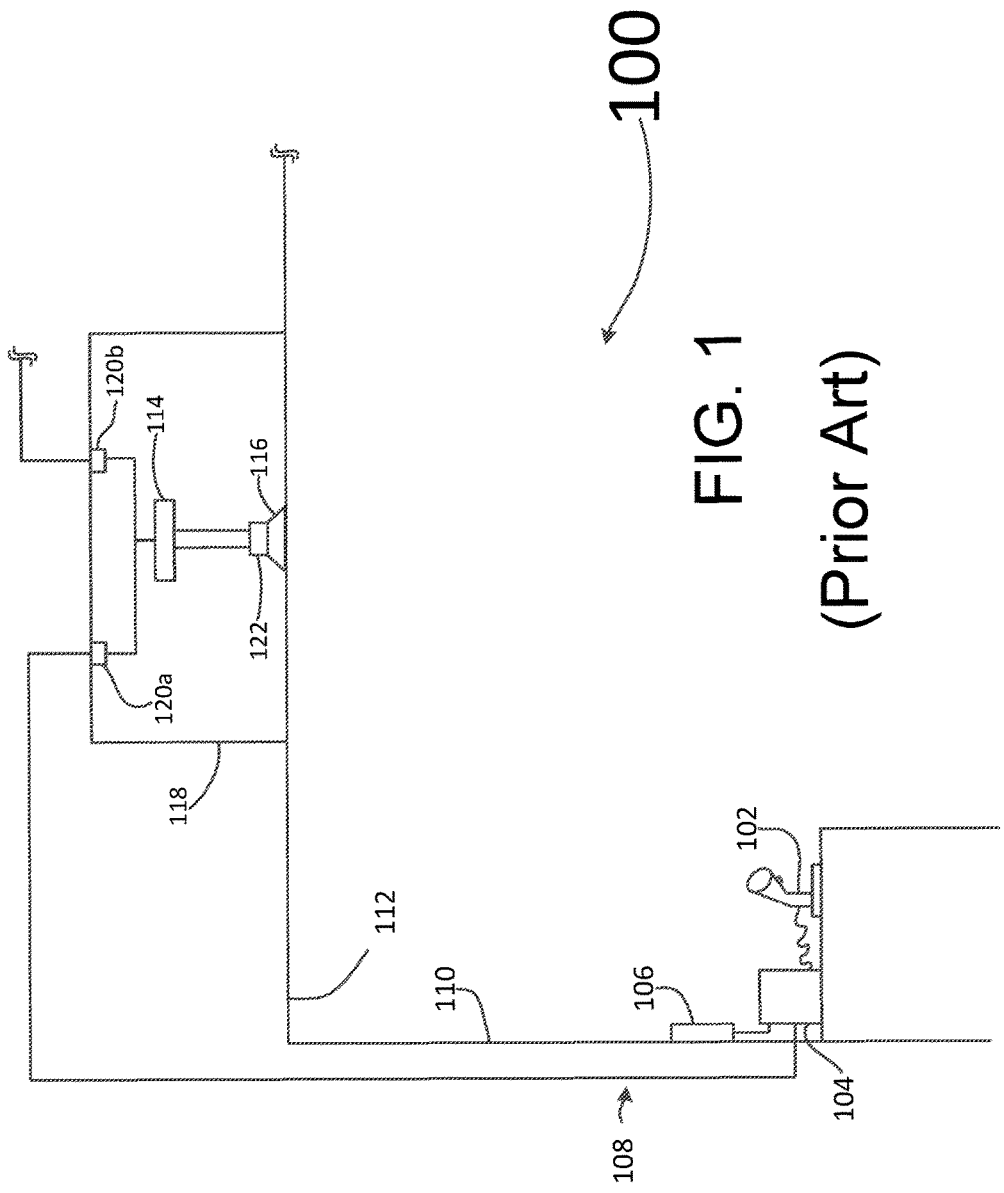
FIG. 1 illustrates a known audio distribution system.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of an enterprise location with existing 70/100 volt speaker system. However, the embodiments to be discussed next are not limited to these systems but can be applied to other types of locations in which an existing 70/100 volt speaker network can be upgraded and improved, or new installations of 70/100 volt speaker networks.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics can be combined in any suitable manner in one or more embodiments.

According to embodiments, the problems described above can be addressed by, for example, retrofitting existing analog 70/100 volt analog speaker systems with a system that tests existing audio wiring cables for digital data throughput capacity, and basing compression levels of transmitted digital audio signals on the digital data throughput capacity. Further, the problems described above can also be addressed by, for example, providing a digital circuit that can receive and transmit digital audio signals, and process the same using one or more of a digital signal processor, amplifier, signal conditioner, coding and decoding circuits, crossover networks, and a microphone. The microphone can be used to monitor speaker output, listen to and report ambient noises as well as report specific acoustical activities.

Used throughout the specification are several acronyms, the meanings of which are provided as follows:
AC Alternating Current
ADC Analog-to-Digital Converter
AFE Analog Front End
AMP Amplifier
App Application
AV Audio Video
BPF Band Pass Filter
CODEC Coding/Decoding Circuit
DAC Digital-to-Analog Converter
DSS Digital Speaker System
DSP Digital Signal Processor
Gbps Giga Bits-per-Second
HPF High Pass Filter
IC Integrated Circuit
IEEE Institute of Electrical and Electronic Engineers
IP Internet Protocol
LED Light Emitting Diode
Li-Ion Lithium Ion
LPF Low Pass Filter
MAC Media Access Control
Mic Microphone
Mbps Mega Bits-per-Second
PA Public Address System
PC Personal Computer
PD Powered Device
PDA Personal Digital Assistant
PHY Physical Layer
PLC Power Line Communications
POE Power-over-Ethernet
PSE Power Sourcing Equipment
RDSS Retrofit Digital Speaker System
Rx Receiver SPL Sound Pressure Level
Tx Transmitter The following is a list of the elements of the figures in numerical order:
100 Known Audio Distribution System
102 Handheld Microphone
104 Public Address (PA) System Power Supply
106 Wall Mounted Microphone
108 Audio Cable
110 Wall
112 Ceiling
114 Transformer
116 Speaker
118 Speaker Enclosure
120 Audio Input/Output Jacks
122 Crossover Circuitry
200 Retrofit Digital Speaker System (RDSS)
201 Retrofit Digital Speaker System (RDSS) Speaker Enclosure (RDSS Enclosure)
202 Retrofit Digital Speaker System Commissioning Computer and Public Address System (Commissioning Computer)
204 Retrofit Digital Speaker System Circuitry Enclosure (RDSS Circuitry Enclosure)
206 Keyboard
208 Microprocessor Board with Memory
210 Commissioning Software Application (Commissioning App)
302 Digital Audio Cable Jack (Input Jack/Output Jack)
304 Power-over-Ethernet (POE) Controller
306 Power Supply
308 Li-Ion Battery
310 Coupler
312 Signal Conditioner
314 Analog Front End (AFE) Bi-Directional Line Driver Device (Line Driver)
316 Media Access Control (MAC)/Physical Layer (PHY) Control Device
318 Clock Generator
320 Audio Internet Protocol Signal Processor
322 Digital Signal Processor (DSP)
324 Coding/Decoding Circuit (CODEC)
326 Dual Class D Amplifier
328 Microphone
330 Relay
332 Power Sourcing Equipment (PSE) Controller
334 802.11nn Wi-Fi Transceiver
336 BlueTooth Transceiver
338 Data/Command Bus
340 Light Emitting Diodes (LEDs)
342 LED Driver
344 Power Supply Output
346 Battery Output
400 Method for Commissioning One or More Enclosures in a Retrofit Digital Speaker System
402-420 Steps of Method 400

Figure 2:
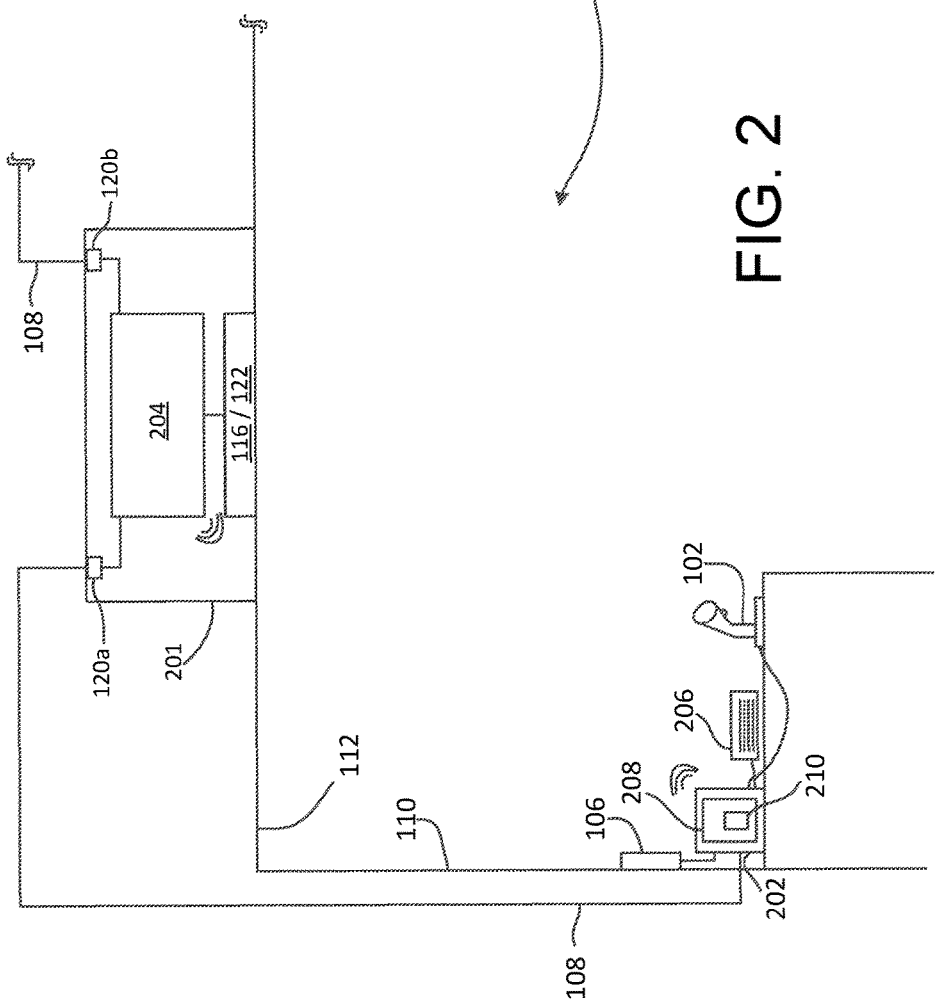
FIG. 2 illustrates a retrofit digital network speaker system according to an aspect of the embodiments.

Attention is directed to FIG. 2, which illustrates retrofit digital speaker system (RDSS) 200 according to an aspect of the embodiments. RDSS 200 is a retrofit system of the speaker system shown in FIG. 1, with several improvements to take advantage of technological advances as evidenced in the aspects of the embodiments. Such a retrofit system can save the owner/operator of an enterprise location significant amounts of money and time yet yield significant improvements in terms of projecting music and voice to large locations, such as airport, bus, and railroad terminals, waiting rooms, auditoriums, stadiums, and the like. According to aspects of the embodiments, improved audio can be provided by using digital techniques, including the equipment and devices as described herein, yet costs can be constrained because only RDSS circuitry enclosures 204 need to be installed, and the existing audio cables can be used. This means new cabling does not have to be installed, which costs a significant amount of money, and which inconveniences patrons and users of the enterprise location when such installation does occur. Furthermore, when, in the future, the owner(s)/operator(s) of the enterprise location install new cabling, the now existing equipment according to aspects of the embodiments can be used interchangeably with the new cabling, thus providing even greater audio reproduction capabilities.

The assemblies of FIG. 1 and FIG. 2 are relatively similar in appearance, in that substantial changes (e.g., new devices) are not required to significantly improve the quality of audio being projected by the speakers of the new system in use of the aspects of the embodiments. In FIG. 2, there is added combined digital audio network speaker commissioning computer and public address system (commissioning computer) 202, keyboard 206, and retrofit digital speaker system circuitry enclosure (RDSS circuitry enclosure) 204, which is contained by retrofit digital speaker system (RDSS) speaker enclosure (RDSS enclosure) 201. Contained within commissioning computer 202 is microprocessor board 208, and within memory stored therein, is commissioning application (commissioning App) 210. Commissioning App 210 is discussed in greater detail below.

RDSS circuitry enclosure 204 contains the circuitry and other components that are used, according to aspects of the embodiments, and as described below, to receive and process digital audio signals, receive, process and distribute power (which could be either or both of alternating current (AC) and direct current (DC) power), and provide feedback information to commissioning computer 202 either via wired or wireless means for substantially immediate action and/or reporting and/or archiving purposes. According to aspects of the embodiments, to go from known audio distribution system 100, which exists in the noisy analog domain, to the digital audio domain of RDSS 200, all that is required is the use or installation of commissioning computer 202 and the installation of RDSS circuitry enclosures 204 at each of the speaker locations, in the manner indicated in the accompanying Figures and as described herein.

Commissioning computer 202 can combine the aspects of a public address system, as well as commissioning App 210 that can be used in setting up and interfacing with each of a plurality of RDSS circuitry enclosures 204. That is, commissioning App 210 is a software application that allows one or more users the ability to set up RDSS 200 and communicate with each of RDSS circuitry enclosures 204 either in a wired or wirelessly manner. Commissioning computer 202 can also be a stand-alone personal computer (PC), and in that case RDSS 200 further comprises power supply 104. Keyboard 206 is but one of several interface means for accessing commissioning computer 202, and other means can include a touch screen or panel (a display is not shown in FIG. 2), or through use of a "smart phone" (Android, Apple-based, or some other design), personal digital assistant (PDA), laptop, notebook computer, and the like, and any/all variations thereof, according to aspects of the embodiments. Commissioning App 210 can be used, in whole or in part (e.g., a portion of commission App 210 is on commissioning computer 202 and a portion resides on the portable electronic computing communications device), on any one or more of smartphones, PDAs, laptops, or other electronic computing devices, as can be appreciated by those of skill in the art.

Figure 3:
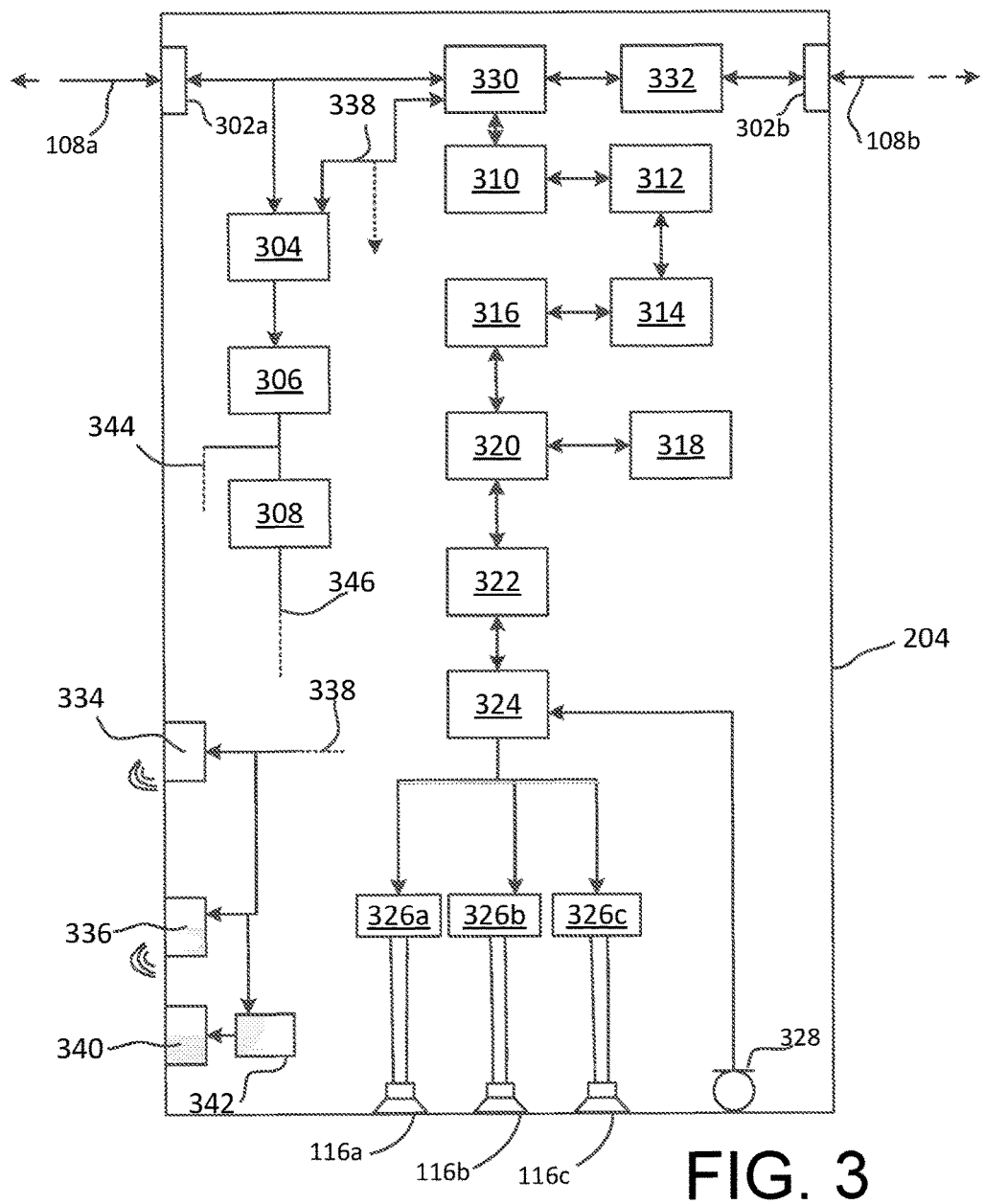
FIG. 3 illustrates a component of the retrofit digital network speaker system of FIG. 2 according to an aspect of the embodiments.

Attention is directed to FIG. 3 and the components of RDSS circuitry 204 for use in RDSS 200. RDSS circuitry enclosure 204 can include speakers 116a-c (although, as those of skill in the art can appreciate, there can be more or less speakers than the three depicted in FIG. 2), although it does not have to. That is, speakers 116a-c can be located outside of RDSS circuitry enclosure 204. RDSS circuitry enclosure 204 further comprises input/output jacks 302a,b, which interfaces with digital audio cable 108. The output of input jack 302a is connected to relay 330. The output of relay 330 is input to power sourcing equipment (PSE) controller 332, the output of which is connected to output jack 302b, which is connected to output cable 108b (which then becomes input cable 108a to the next RDSS enclosure 201). Digital audio signals are received at input jack 302a, and output to output jack 302b through relay 330 such that the same digital audio signals are transmitted to one or more speaker assemblies, or RDSS enclosures 201 within an enterprise environment. Relay 330 serves several uses according to aspects of the embodiments. For example, each respective relay 330 isolates each speaker set down the chain; that is, upon installation, and before power-up and calibration, each relay 330 is pre-set in a normally open condition. Each path step (e.g., a first path step from commissioning computer 202 to a first RDSS circuitry enclosure 204a (located within RDSS enclosure 201a), then a second path step from first RDSS circuitry enclosure 204a to second RDSS circuitry enclosure 204b (located within RDSS enclosure 201b), and so on) can be opened sequentially in order to perform a calibration of its respective audio cable 108 according to aspects of the embodiments. Thus, relays 330 provide a means for discovering the topology of RDSS 200 according to aspects of the embodiments. Power sourcing equipment (PSE) controller 332 is located on the output of relay 330, and is adapted to provide a means for extracting either or both of AC and DC power that can be carried by audio cable 108 according to aspects of the embodiments. In addition, PSW 332 can provide additional circuit protection as it can recognize valid devices "downstream" prior to outputting power to such devices. Such use of PSE controller 332 is known to those of skill of the art, and therefore need not be repeated in fulfillment of the dual purposes of clarity and brevity.

As those of skill in the art can appreciate, it is known that direct current (DC) voltage can be added to digital data lines to transmit power to where it might not be available normally for use by other devices or circuitry. One such system is known as "power-over-Ethernet" (PoE). In a PoE system, direct voltage current is added to Ethernet cables and power can be brought to places that might be hundreds of feet from conventional power lines. Another such system is power line communications (PLC). PLC, however, solves an opposite problem as that as the PoE system: In PLC, data signals are added to power lines so that digital information can be distributed in a wired manner over existing house or enterprise 120 volts alternate current (VAC) wiring. Thus, both PoE and PLC provide power and digital data communications to remote locations; while not precisely "equal but opposite" it is apparent to those of skill in the art that in PLC, power can be distributed much more efficiently, and thus data throughput will suffer, while in PoE, digital signal transmissions can exceed tens of thousands of megabytes per second, or even gigabytes per second, yet the amount of power is severely constrained when viewed in regard to PLC communications.

Although not formally configured according to established PoE specifications, aspects of the embodiments as shown in FIG. 2 can use a substantially similar arrangement with known PoE components, such as PoE controller 304 to control DC voltage/current supplied to RDSS 200 for use by speakers 116 and other components within RDSS circuitry enclosure 204.

Thus, in RDSS 200, DC voltage/current can added to cables 108 along with the digital audio signals so that power is available for a plurality of purposes. For example, the power supplied by cables 108 through PoE controller 304 can be used to power all of the respective circuitry as represented by devices 332, 312, 314, 316, 320, 318 322, 324, and 326 via power supply 306 (through power supply output 344), according to aspects of the embodiments (the interconnections between power supply 306 and the other devices haven been omitted from FIG. 3 in fulfillment of the dual purposes of clarity and brevity). In addition, the power supplied by cables 108 can be directed by PoE controller 304 to charge battery 308 through power supply 306 (which can be used to step-up or step-down the DC voltage to the appropriate level) for use with speakers 116a-c and dual class-D amplifier (amplifier) 326, in a manner known to those of skill in the art. Battery output 346 can be connected to speakers 116, among other devices.

Figure 4:
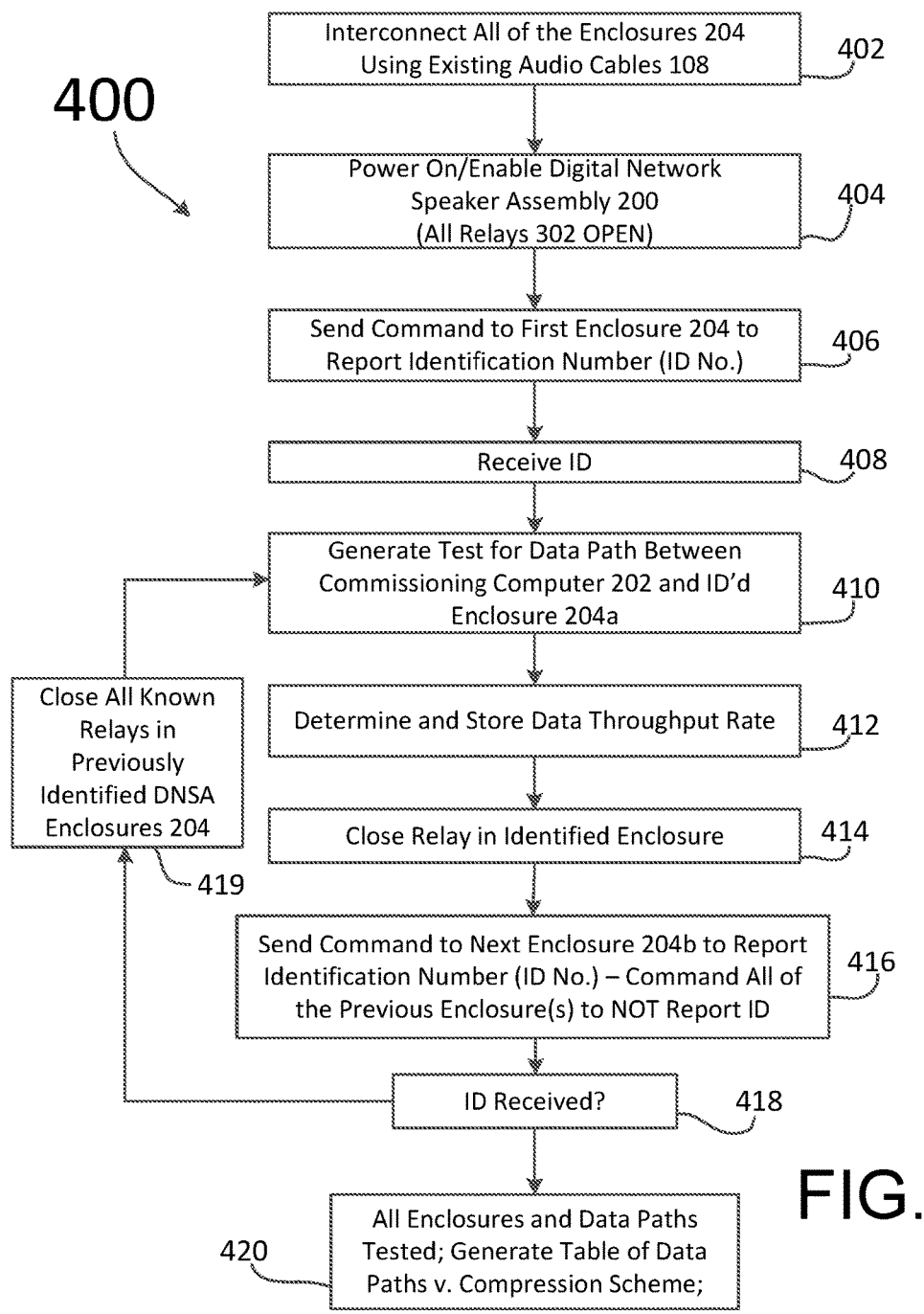
FIG. 4 illustrates a flow chart of a method for commissioning one or more retrofit digital network speaker system enclosures in the digital network speaker system of FIG. 3 according to aspects of the embodiments.

Upon installation, as discussed above, all of relays 330a-n, for respective RDSS circuitry enclosures 204a-c are maintained in an open state so that no digital audio and/or DC voltage/current can pass to the next enclosure in the chain. Once all of RDSS circuitry enclosures 204a-n have been installed, commissioning of RDSS 200 can begin through use of commissioning App 210, as found in commissioning computer 202, or some other computer device, as described above. A method for commissioning RDSS 200 is shown in FIG. 4, and described in greater detail below.

As discussed above, digital audio signals, along with DC power, can be received by RDSS circuitry enclosure 204 at input jack 302a, whereupon relay 330 is either closed to allow the same digital audio signal with/without DC power to further speaker assemblies in further RDSS circuitry enclosures 204, or is open to prevent sending the digital audio signal downstream through output jack 302b. According to further aspects of the embodiments, relay 330 can be completely open, or closed to allow digital audio to its respective enclosure and speakers 116, or closed to allow digital audio signals to only output jack 302b, or can be closed to allow digital audio signals to both coupler 310 and output jack 302b. This allows commissioning App 210 to bypass one or more RDSS circuitry enclosures 204 if problems develop in them for any one of at least several different reasons, such as damaged/destroyed speakers, temporary thermal shutdown, among others.

Following relay 330 is coupler 310. According to aspects of the embodiments, coupler 310 can be a power line communications (PLC) coupler that forms an isolation barrier between the DC power that might be present on cables 108 and the remainder of the circuitry on the other side of coupler 310. PLC coupler can be used to reliably transmit speech, energy management data, and power system protection signals on power lines. Furthermore, according to aspects of the embodiments, coupler 310 can be fashioned in the form of a high pass filter (HPF) that allows high speed digital audio signals to pass, while blocking the DC voltage and current (e.g., a transformer or capacitor network).

Examples of commercially available devices of coupler 310 can be simple device such as a capacitor or transformer. Another example is the MCD80 modular coupling device, manufactured by ABB Inc., 3055 Orchard Drive, San Jose Calif.; see, http://new.abb.com/network-management/communication-networks/power-line-carriers/mcd80. Another example is embodied by the 750510476 MID-PLC power line communications coupling transformer, manufactured by Wurth Electronik, GmbH & Co., KG, Germany (see, http://www.we-online.de/web/en/wuerth_elektronik/start.php?_ga=1.48203300.2040351129.147699 5709).

Following coupler 310 is signal conditioner 312. Signal conditioner 312 comprises a passive network that implements additional filtering typically used in PLC communications. Signal conditioner 312 filters power supply ripple, provides transient suppression and can be fabricated as an inductor-capacitor filter and transient suppression diodes.

Following coupler 312 is analog front end (AFE) bi-directional line driver device (line driver) 314. As those of skill in the art can appreciate, line drivers 314 are typically used to provide a matched impedance transmission of digital signals to circuits located on the output side. An example of a commercially available device of line driver 314 is the AFE031 line driver manufactured by Texas Instruments, and which is a low-cost, integrated, powerline communications (PLC) analog front-end (AFE) device that is capable of capacitive- or transformer-coupled connections to the powerline while under the control of a DSP or microcontroller. A further example of a bi-directional line driver is the AR1500 AFE/Line Driver IC manufactured by Qualcomm Atheros, of San Jose, Calif., a subsidiary of Qualcomm, Inc., also of San Diego, Calif.

Following line driver 314 is media access control (MAC)/physical layer control (PHY) (MAC/PHY) control device 316 commonly used in PLC communications. MAC/PHY control device 316 translates PLC signals to a digital format that can be used for internet protocol (IP) communications to a processor. An example of a commercially available device of MAC/PHY control device is Atheros AR7400, described as a Institute of Electronics and Electrical Engineers (IEEE) 1901 compliant MAC/PHY transceiver.

The output of MAC/PHY control device 316 is connected to audio processor 320 according to aspects of the embodiments. Audio processor 320 receives the digital audio signals that have been encoded in an IP format, and converts them to a pulse code modulation (PCM) format; in addition, audio processor 320 can also encode PCM formatted digital audio signals into an IP format. Clock 318 generates a clock signal, as known to those of skill in the art, which can be used by audio processor 320. Clock 318 is programmable and controllable according to aspects of the embodiments, and can be used by one or more of the other devices within RDSS circuitry enclosure 204.

The PCM digital audio signal that is output from audio processor 320 is received by digital signal processor 322. DSP 322 can perform numerous functions such as parametric equalization, filtering (BPF, LPF, HPF), compensation, gain, gate functions, among others. The output of DSP 322 is input to CODEC 324.

According to aspects of the embodiments, CODEC 324 comprises both one or more analog-to-digital (ADC) converters, and one or more digital-to-analog (DAC) converters. CODEC 324 receives the PCM (or IP) formatted audio signal, and converts it into a PWM formatted digital audio signal, which can be used by the Class D audio amplifier (amplifier) 326. In fulfillment of the dual purposes of clarity and brevity, a detailed discussion of operation of amplifier 326 will be omitted from herein. However, it is to be noted that amplifier 326 receives voltage/current from power supply 306. Battery 308, as those of skill in the art can appreciate, can be used in the event of significant over-voltage/current situations, which can occur during peak power situations in which the output voltage might be driven higher than the POE steady state power level. The use of battery 308 provides a significant reservoir of power for use by amplifier 326 so that clipping and other distortions are substantially prevented or reduced; that is, in the event the power required by the audio signal exceeds that of the power transmitted along the wire, peak power can be provided by battery 308. In this manner, battery 308 acts as a "reservoir" to be used when needed. According to aspects of the embodiments, there can be only one speaker, two speakers, three speakers, and so on, within RDSS circuitry enclosure 204 and RDSS enclosure 201, each of which can have a separate uniquely tuned amplifier 326a-c (as shown), or the amplifiers 326 do not necessarily have to be uniquely tuned, e.g., they can each be broadband amplifiers. According to further aspects of the embodiments, the current and voltage input into speakers 116a-c can be monitored (by one or more of DSP 322, audio processor 320, among other types of circuitry) so that substantially accurate impedance measurements can be made of the speakers, and in this additional manner the "health" of the speaker can be monitored. According to further aspects of the embodiments, an example of a class D amplifier is Maxim MAX98400B, which is a dual 2×12 watt amplifier in a single package.

Also included in RDSS circuitry enclosure 204 is microphone (mic) 328; mic 328 can facilitate the performance and execution of several advanced features in RDSS 200 according to aspects of the embodiments. For example, mic 328 can be used (a) to determine if the audio is being broadcast as intended, (b) to check the audio quality (distortion, frequency response, sound pressure levels (SPL); such audio quality determination can be used for, among other things, balancing of audio output), (c) to provide full duplex intercom, (d) perform gunshot detection, (e) perform acoustic echo cancellation, (f) ambient noise compensation, among other functions/features.

Feature (a), determination of whether the audio is being broadcast as intended, can also be described as "audio confidence." Audio confidence is a feature that can be used for many different situations, including the determination of whether emergency messages, advertisements, or other public service messages are being broadcast. Mic 328 is enabled at the same time an announcement is made, and a record is made at the same time of the announcement at one or more RDSS enclosures 201; the audio is recorded, and can be transmitted back to commissioning App 210 for verification, or verification can occur within DSP 322, and the results transmitted back to commissioning App 210 for report generation and/or archival purposes.

Feature (b), determination of audio quality, includes the use of mic 328 to determine distortion and level detection, and other characteristics. To perform audio quality determination, one test involves determining the output level versus frequency, and this can be measured in real or substantially real-time, and distortion can be measured off-line with sine wave sweeps. That is, according to aspects of the embodiments, DSP 322 can create a sine wave of known amplitude, and sweep the signal from $f_1$ to $f_2$, $f_3$ to $f_4$, and $f_5$ to $f_6$, for each of the three speakers (i.e., $f_1$ to $f_2$ is the frequency range for speaker 116a, $f_3$ to $f_4$ can be the frequency range for speakers 116b, and $f_5$ to $f_6$ can be the frequency range for speaker 116c). Alternatively, DSP 322 can output a tone of known frequency and amplitude as well (e.g., output a signal of only about $f_1$, or $f_2$, or $f_3$, and so on). As those of skill in the art can appreciate, the frequency ranges can overlap, but do not necessarily need to. By outputting a signal of known frequency and amplitude from DSP 322, RDSS 200 can receive the signal using microphone 328 and measure the frequency response and amplitude and determine a distortion versus frequency for the speaker-microphone components. As those of skill in the art can appreciate, there are numerous other ways to measure frequency response, such as log sweeps, pink noise generation, and using a known voice, among other methods. The received signal(s) can be digitized and analyzed using fast Fourier Transforms, as those of skill in the art can appreciate, to determine harmonics and other distortion properties.

Feature (c), full duplex intercom, can be implemented on at least several different ways. Once RDSS system 200 is fully calibrated, and commissioning App 210 has ascertained location and placement of each of RDSS enclosures 201, duplex intercom communications can be directed to specific RDSS enclosures 201, or to a range of them, or to all of them, with active listening occurring through use of mics 328. That is, if a user of commissioning App 210 desires to address one or more people at a particular location, commissioning App 210 can provide the means for the user to address the one or more people there. The user can select the particular location(s) (e.g., particular RDSS enclosures 201, through use of an interactive map by way of non-limiting example; a table or list can also be used), then speak into handheld microphone 102 and a corresponding audio signal will then be generated at the selected RDSS enclosures 201, and the user can listen for responses through use of mics 328, according to aspects of the embodiments.

Feature (d), gunshot detection, includes the use of "Spotshotter" algorithms, and a determination of the acoustic signature of a room or enterprise location. With the use of mics 328, speakers 116 can form a sensor mesh that covers a substantially large area that provides additional security when used in conjunction with video monitoring cameras.

Feature (e), acoustic echo cancellation (AEC) can be used for the purpose of improving the operation of circuitry enclosure 204 as an intercom. Feature (f), ambient noise compensation, can be determined by listening to ambient noise levels when no audio is being broadcast; then, when audio is broadcast, the ambient noise can be compensated for by increasing the gain by the amount of ambient noise detected. This allows announcements to be heard more clearly, even when more people are in a room, or some loud activity is going on.

According to further aspects of the embodiments, there is shown in FIG. 3 IEEE 802.11nn Wi-Fi (Wi-Fi) transceiver 334 and Bluetooth transceiver 336, neither, either, or both of which, can be used in RDSS circuitry enclosure 204 to facilitate commissioning and/communications to/from the circuitry of RDSS circuitry enclosure 204. As shown in FIG. 2, commissioning computer 202 can further include one or more of a Wi-Fi transceiver, and Bluetooth transceiver.

As those of skill in the art can now appreciate, many of the devices shown and described in regard to FIG. 3 can be controlled digitally by one or more command signals (e.g., digital command signals); to this end, data/command bus 338 is included as part of the circuitry of RDSS circuitry enclosure 204 that interconnects one or more of PoE controller 304, power supply 306, battery 308, coupler 310, signal conditioner 312, bi-directional line driver 314, MAC/PHY control device 316, clock generator 318, audio internet protocol signal processor 320, digital signal processor 322, CODEC 324, amplifier(s) 326, microphone(s) 328, relay 330, PSE controller 332, Wi-Fi transceiver 334, Bluetooth transceiver 336, and one or more light emitting diodes (LEDs) 340 through LED driver 342 according to aspects of the embodiments. LEDs 340 can be used for emergency lighting, or to send messages, among other operations. LEDs 340 can be controlled by control signals carried by data bus 338, and power can be provided by power supply 306 and/or battery 308. Note that in FIG. 3, interconnections between power supply 306 and other components of FIG. 3, and interconnections between battery 308 and other components of FIG. 3 have been omitted in order to make the Figure less cluttered.

According to aspects of the embodiments, digital command signals generated by commissioning App 210, either on its own, or through interface actions with one or more users, can be processed by either or both of PoE controller 304 and DSP 322. That is, digital commands can be transmitted by computer 202 and commissioning App 210, transmitted via analog audio cables 108, received at each RDSS circuitry enclosure 204, and processed by either or both DSP 320 (after the signals being processed by components that comprises an analog-and-digital interface), or directly by PoE controller 304, according to aspects of the embodiments.

FIG. 4 illustrates a flow chart of method 400 for commissioning one or more RDSS circuitry enclosures 204 located within RDSS enclosure 201 of RDSS 200 as shown in FIG. 3 according to aspects of the embodiments (for the purposes of this discussion, in fulfillment of the dual purposes of clarity and brevity, reference will only be made to RDSS circuitry enclosures 204, though each are located in respective RDSS enclosures 201, as described herein). Method 400 begins with method step 402 wherein one or more RDSS enclosures 201 and circuitry enclosures 204 are interconnected with existing audio cables 108 to form retrofit digital speaker system (RDSS) 200 according to aspects of the embodiments. RDSS 200 includes new RDSS circuitry enclosures 204, and their respective speakers and circuitry, and also can include one or more of microphone 102, PA system amplifier 106, and transformer(s) 114; in this manner, new cabling is not required for the new equipment that is enclosed in RDSS circuitry enclosures 204 according to aspects of the embodiments. In method step 404, power is enabled on the RDSS 200. Upon receipt of power, however, all relays 302 become open until and unless specifically commanded to close.

In method step 406, a first command is sent either by a user directly (e.g., a specific command), or generally (e.g., via a "startup procedure"), using commissioning App 210 to the first RDSS circuitry enclosure 204a; as all of the RDSS enclosures 201 and circuitry enclosures 204a-n are wired serially, and without a priori knowledge of which RDSS circuitry enclosure 204 is the first in the series, commissioning App 210 does not know which RDSS circuitry enclosure 204 is first; further, according to aspects of the embodiments, commissioning App 210 may not know, or does not need to know how many RDSS circuitry enclosures 204, are wired sequentially. Method step 406 and others that follow are the beginning of the learning process by commissioning App 210 to determine how many RDSS circuitry enclosures 204 make up RDSS 200, learn their identification numbers, and where they are in the sequential chain.

Thus, in method step 406, commissioning App transmits a first command to a first RDSS circuitry enclosure 204a to ascertain its identification number. Since all of relays 330 in all of the RDSS circuitry enclosures 204 are open, only the first sequentially wired RDSS circuitry enclosure 204a will receive the first command to provide an identification code or number. As those of skill in the art can appreciate, such RDSS circuitry enclosure 204 identification code or number can be numbers only (like a part number), or a combination of alpha-numeric identifiers, or a groups of codes/words that specifically identifies that particular RDSS circuitry enclosure 204.

When the first in the series of RDSS circuitry enclosures 204 receives the command to provide its identification code, such command can be received by PoE controller 304; PoE controller 304 can then respond with a message that provides the respective RDSS circuitry enclosure 204a identification code, which has been uniquely provided to it (e.g., by way of an programmable read only memory (PROM) chip, for example, or a set of switches, when manufactured). In method step 408, commissioning App 210 receives the unique enclosure code and begins the process of forming a list, or table, which associates that particular RDSS circuitry enclosure 204a with its position in the serial placement of RDSS circuitry enclosures 204.

In method step 410, commission App 210 generates and transmits a data through-put test to determine the transmission through-put rate in the path from commissioning computer 202 and the first RDSS circuitry enclosure 204a. Such transmission data through-put test can be made of known sequences of digital words, and can progress from slower to faster speeds; each transmission of test data words at a known frequency or data transfer rate can be referred to as a test iteration. After each test iteration, commissioning computer 202 and commission App 210 determines whether all of the words were transmitted, received, and reported back correctly (thus the test incurs transmission of the test data, and a "read" of what test data was received by the RDSS circuitry enclosures 204 under test). This process continues until an unacceptable error rate is determined (method step 412); as those of skill in the art can appreciate, such error rates can be determined empirically, and can change from system to system, depending on the electrical characteristics of RDSS 200. Referring to Table I below, it can be seen that commission App 210 and commissioning computer 202 can generate a table of data rate classifications versus the different RDSS circuitry enclosures 204:

TABLE I

| Data Through-put Level | MB/S | RDSS/Circuitry Enclosures |
|---|---|---|
| 1 | 1 | 31-50 |
| 2 | 5 | 23-30 |
| 3 | 10 | 13-22 |
| 4 | 25 | 6-12 |
| 5 | 100 | 1-5 |

Thus, Table I indicates that Level 5, with the highest data through-put rate of at least 100 MB/s, includes only the first five RDSS circuitry enclosures 204 (out of 50 total). As the RDSS circuitry enclosures 204 get farther away (the higher numbered RDSS circuitry enclosures 204), the lower the data through-put rate (e.g., Level 1 has a data through-put rate of 1 MB/s, and includes RDSS circuitry enclosures 204 31-50.

According to further aspects of the embodiments, one or more compression algorithms can also be tested, either concurrently with the test as previously described, or afterwards. As the frequency or data throughput increases, the amount of compression needed to maintain a predefined level of audio quality (e.g., acceptable error rate) is reduced. But, as the data throughput goes down, the amount of compression needed to maintain the quality of audio increases. If the amount of compression needed exceeds the amount of compression that can be provided, or exceeds a certain threshold, then audio quality will suffer.

In method step 412, the data throughput rate, with or without an acceptable compression ratio, is stored with the identification information for the respective RDSS circuitry enclosure 204a; then, in method step 414, commissioning App 210 closes relay 330 in the identified RDSS circuitry enclosure 204, in order to begin testing of the data throughput rate to the second or next RDSS enclosure 204n. In method step 416, a command is sent to the next RDSS circuitry enclosure 204n to report its identification number or code, as was previously performed in method step 406 with the first RDSS circuitry enclosure 204a; however, this command is slightly different (and will be different for each iteration of this step), in that the command will specifically address each of the previously identified RDSS circuitry enclosures 204a-n, and specifically request that each not report their respective identities.

In method step 418, commissioning App 210 determines whether or not it received a new identification code; if not ("No" path from decision step 418), then method 400 and commissioning App 210 has determined that no additional RDSS circuitry enclosures 204 remain to be tested. Then, in method step 420, a complete list of RDSS circuitry enclosures 204a-m (m being the total number of RDSS circuitry enclosures 204), their respective identification codes and data through-put rates, and, according to further aspects of the embodiments, respective compression ratios, can be generated. This table can be used when digital audio data is transmitted in future audio transmissions.

If, however, it is determined that a new identification code was received in response to the transmission of method step 416 ("Yes" path from decision step 418), then method 400 and commission App 210 closes all of the respective relays in the known RDSS circuitry enclosures 204 in method step 419, and then method 400 returns to method step 410 and a new data through-put test is generated for the new data path (steps 410, 412, 414, and 416). This iterative loop repeats until no new identifications are received ("No" path from decision step 418).

The disclosed embodiments provide systems, methods, and modes for providing a distributed bidirectional-communications network speaker system for the transport of digital audio information. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A retrofit digital speaker system comprising two or more retrofitted speaker enclosures, each of the two or more retrofitted speaker enclosures (enclosures) comprising:
   at least one speaker;
   an analog-and-digital interface adapted to receive digitally encoded audio signals, electrical power, and digital command signals, and wherein the digitally encoded audio signals, electrical power, and digital command signals are transmitted over existing two wire analog audio cables, and further wherein the two or more retrofitted speaker enclosures are wired in a daisy chain fashion, via the existing two wire analog audio cables; and
   a relay in each of the two or more retrofitted speaker enclosures adapted to remain normally open on power-up such that the digitally encoded audio signals, electrical power, and digital command signals received by a first enclosure and relay are not transmitted to a second enclosure unless and until specifically commanded to do so.

2. The retrofit digital speaker system according to claim 1, further comprising:
   a digital signal processor (DSP) adapted to receive and process the digitally encoded audio signals and digital command signals; and
   a coder-decoder device adapted to receive and decode the digitally encoded audio signals from the DSP to produce output analog audio signals, and is further adapted to receive and encode input analog audio signals from at least one microphone to produce return digital audio signals to be sent to the DSP.

3. The retrofit digital speaker system according to claim 1, wherein the analog-and-digital interface comprises:
   a power-over-Ethernet (PoE) controller adapted to extract electrical power from the audio cables and direct the electrical power to one or more power supplies; and
   a coupler circuit adapted to substantially separate all of the electrical power from the digitally encoded audio signals and digital command signals.

4. The retrofit digital speaker system according to claim 3, wherein the coupler circuit comprises at least one of a high pass filter and transformer.

5. The retrofit digital speaker system according to claim 3, wherein the analog-and-digital interface further comprises:
   a signal conditioner adapted to receive the digitally encoded audio signals and digital command signals and further remove electrical power;
   an analog front end bi-directional line driver device adapted to provide a substantially matched impedance transmission path between remaining circuitry in the enclosure and the two wire analog audio cable;
   a media access control/physical layer control (MAC/PHY) device adapted to translate PLC signals to a digital format that can be used for internet protocol (IP) communications, and for translating from an IP protocol format to the PLC-type signals; and
   an audio processor adapted to receive the digital IP encoded audio signals from the MAC/PHY device and convert them to a pulse code modulation (PCM) format, and to encode PCM formatted digital audio signals into an IP format.

6. The retrofit digital speaker system according to claim 1, further comprising:
   at least one microphone, and wherein
   the analog-and-digital interface is further adapted to provide a bi-directional communication capabilities through use of the at least one speaker and the at least one microphone.

7. The retrofit digital speaker system according to claim 6, wherein
   the microphone and other components of the digital network speaker system are adapted to do one or more of (a) determine if an audio signal is being broadcast as intended, (b) determine a quality of the broadcast audio signal (distortion, frequency response, sound pressure levels (SPL)), (c) provide full duplex intercom, (d) perform gunshot detection, (e) perform acoustic echo cancellation, and (f) ambient noise compensation.

8. The retrofit digital speaker system according to claim 1, further comprising:
   a commissioning computer, the commissioning computer including a commissioning software application (App), the App adapted to generate a plurality of commands adapted to
   generate a first test signal to a first enclosure,
   measure a data throughput rate in a first path between the commissioning computer and the first enclosure, wherein the first relay remains open,
   generate a command that closes the first relay,
   generate a second test signal to the second enclosure, and
   measure a data throughput rate in a second path between the commissioning computer and the second enclosure through the first enclosure, and subsequently generate additional commands and test signals to discover and measure paths between all of the subsequent enclosures that make up the digital network speaker system.

9. The retrofit digital speaker system according to claim 8, wherein each of the one or more speaker enclosures further comprises:
   a microphone adapted to receive and convert audible sounds to an analog audio signal, the CODEC adapted to convert the received analog audio signal into a digital audio signal, and wherein
   the DSP is further adapted to add a time date stamp to the digital audio signal, and wherein
   the App is adapted to process each of one or more such time date stamped digital audio signals to determine which of a plurality of speaker enclosures first received the analog audio signal.

10. The retrofit digital speaker system according to claim 8, further comprising:

a battery adapted to provide peak power to the at least one speaker when a received audio signal requires power in excess of the electrical power provided by the two wire analog audio cables.

11. A method for commissioning two or more retrofitted speaker enclosures in a retrofit digital speaker system, the method comprising:

daisy-chain connecting each of the two or more retrofitted speaker enclosures using two wire analog audio cables;

transmitting digitally encoded audio signals, electrical power, and digital command signals over the daisy-chained two wire analog audio cables;

receiving digitally encoded audio signals, electrical power, and digital command signals at an analog-and-digital interface in a first retrofitted speaker enclosure; and preventing the received digitally encoded audio signals, electrical power, and digital command signals from being transmitted to a second or subsequent retrofitted speaker enclosure by a normally open relay in series with the two wire daisy-chained analog audio cables.

12. The method according to claim 11, further comprising:

receiving a first command at the first retrofitted speaker enclosure to report an identification number of the first retrofitted speaker enclosure;

transmitting a first response to the first command that includes at least the first identification number of the first retrofitted speaker enclosure;

receiving a first data path test message at the first retrofitted speaker enclosure; and determining a data through-put rate for a first path that comprises the path from a commissioning computer to the first retrofitted speaker enclosure, and storing the same based on the first identification number.

13. The method according to claim 12, further comprising:

receiving a second command at the first retrofitted speaker enclosure to close the normally open relay in series with the two wire daisy-chained analog audio cables;

receiving a third command at the second retrofitted speaker enclosure to report an identification number of the second retrofitted speaker enclosure;

transmitting a second response to the third command that includes at least the second identification number of the second retrofitted speaker enclosure;

receiving a second data path test message at the second retrofitted speaker enclosure;

determining a data through-put rate for a second path that comprises the first path plus a path from the first retrofitted speaker enclosure to the second retrofitted speaker enclosure, and storing the same based on the second identification number.

14. The method according to claim 13, further comprising:

repeating the steps of transmitting commands to close normally open relays, determining an identification number of a next subsequent speaker enclosure, determining a respective data throughput rate from the commissioning computer to the next subsequent speaker enclosure, and storing the respective data throughput rate based on the respective retrofitted speaker enclosure identification number until all of the retrofitted speaker enclosures have been tested for their respective data throughput rates.

15. The method according to claim 14, further comprising:

generating a table that lists retrofitted speaker enclosures versus respective data throughput rates; and applying a compression algorithm to the digitally encoded audio signals and digital command signals that increases the compression of the digitally encoded audio signals and digital command signals in direct proportion to the data throughput rate to the respective retrofitted speaker enclosures that the digitally encoded audio signals and digital command signals are being directed to.

16. The method according to claim 11, further comprising:

receiving audio signals by at least one microphone in two or more retrofitted speaker enclosures, and converting the same to an analog audio signal;

converting the received analog audio signal into a return digital audio signal; and processing the return digital audio signal to perform one or more of
(a) determining if an audio signal is being broadcast as intended,
(b) determining a quality of the broadcast audio signal, wherein the quality includes one or more distortion levels, frequency response, and sound pressure levels,
(c) providing full duplex intercom,
(d) performing gunshot detection,
(e) performing acoustic echo cancellation, and
(f) performing ambient noise compensation.

17. The method according to claim 16, further comprising:

adding a time-date stamp to the return digital audio signal, such that a commissioning computer can be adapted to determine which of a plurality of retrofitted speaker enclosures first received the analog audio signal.

18. A retrofit digital speaker system comprising two or more retrofitted speaker enclosures, each of the two or more retrofitted speaker enclosures (enclosures) comprising:

at least one speaker;

an analog-and-digital interface adapted to receive digitally encoded audio signals, electrical power, and digital command signals, and wherein the digitally encoded audio signals, electrical power, and digital command signals are transmitted over existing two wire analog audio cables, and further wherein the two or more retrofitted speaker enclosures are wired in a daisy chain fashion, via the existing two wire analog audio cables; and a commissioning computer, the commissioning computer including a commissioning software application (App), the App adapted to generate a plurality of commands adapted to generate a first test signal to a first enclosure, measure a data throughput rate in a first path between the commissioning computer and the first enclosure, wherein the first relay remains open, generate a command that closes the first relay, generate a second test signal to the second enclosure, and measure a data throughput rate in a second path between the commissioning computer and the second enclosure through the first enclosure, and subsequently generate additional commands and test signals to discover and measure paths between all of the subsequent enclosures that make up the digital network speaker system.

19. The retrofit digital speaker system according to claim 18, further comprising:
a relay in each of the two or more retrofitted speaker enclosures adapted to remain normally open on power-up such that the digitally encoded audio signals, electrical power, and digital command signals received by a first enclosure and relay are not transmitted to a second enclosure unless and until specifically commanded to do so.

20. The retrofit digital speaker system according to claim 18, further comprising:
a digital signal processor (DSP) adapted to receive and process the digitally encoded audio signals and digital command signals; and
a coder-decoder device adapted to receive and decode the digitally encoded audio signals from the DSP to produce output analog audio signals, and is further adapted to receive and encode input analog audio signals from at least one microphone to produce return digital audio signals to be sent to the DSP.

21. The retrofit digital speaker system according to claim 18, wherein the analog-and-digital interface comprises:
a power-over-Ethernet (PoE) controller adapted to extract electrical power from the audio cables and direct the electrical power to one or more power supplies; and
a coupler circuit adapted to substantially separate all of the electrical power from the digitally encoded audio signals and digital command signals.

22. The retrofit digital speaker system according to claim 21, wherein the coupler circuit comprises at least one of a high pass filter and transformer.

23. The retrofit digital speaker system according to claim 21, wherein the analog-and-digital interface further comprises:
a signal conditioner adapted to receive the digitally encoded audio signals and digital command signals and further remove electrical power;
an analog front end bi-directional line driver device adapted to provide a substantially matched impedance transmission path between remaining circuitry in the enclosure and the two wire analog audio cable;
a media access control/physical layer control (MAC/PHY) device adapted to translate PLC signals to a digital format that can be used for internet protocol (IP) communications, and for translating from an IP protocol format to the PLC-type signals; and
an audio processor adapted to receive the digital IP encoded audio signals from the MAC/PHY device and convert them to a pulse code modulation (PCM) format, and to encode PCM formatted digital audio signals into an IP format.

24. The retrofit digital speaker system according to claim 18, further comprising:
at least one microphone, and wherein
the analog-and-digital interface is further adapted to provide a bi-directional communication capabilities through use of the at least one speaker and the at least one microphone.

25. The retrofit digital speaker system according to claim 24, wherein
the microphone and other components of the digital network speaker system are adapted to do one or more of (a) determine if an audio signal is being broadcast as intended, (b) determine a quality of the broadcast audio signal (distortion, frequency response, sound pressure levels (SPL)), (c) provide full duplex intercom, (d) perform gunshot detection, (e) perform acoustic echo cancellation, and (f) ambient noise compensation.

26. The retrofit digital speaker system according to claim 18, wherein each of the one or more speaker enclosures further comprises:
a microphone adapted to receive and convert audible sounds to an analog audio signal, the CODEC adapted to convert the received analog audio signal into a digital audio signal, and wherein
the DSP is further adapted to add a time date stamp to the digital audio signal, and wherein
the App is adapted to process each of one or more such time date stamped digital audio signals to determine which of a plurality of speaker enclosures first received the analog audio signal.

27. The retrofit digital speaker system according to claim 18, further comprising:
a battery adapted to provide peak power to the at least one speaker when a received audio signal requires power in excess of the electrical power provided by the two wire analog audio cables.

28. A method for commissioning two or more retrofitted speaker enclosures in a retrofit digital speaker system, the method comprising:
daisy-chain connecting each of the two or more retrofitted speaker enclosures using two wire analog audio cables;
transmitting digitally encoded audio signals, electrical power, and digital command signals over the daisy-chained two wire analog audio cables;
receiving digitally encoded audio signals, electrical power, and digital command signals at an analog-and-digital interface in a first retrofitted speaker enclosure;
receiving a first command at the first retrofitted speaker enclosure to report an identification number of the first retrofitted speaker enclosure;
transmitting a first response to the first command that includes at least the first identification number of the first retrofitted speaker enclosure;
receiving a first data path test message at the first retrofitted speaker enclosure; and
determining a data through-put rate for a first path that comprises the path from a commissioning computer to the first retrofitted speaker enclosure, and storing the same based on the first identification number.

29. The method according to claim 28, further comprising:
preventing the received digitally encoded audio signals, electrical power, and digital command signals from being transmitted to a second or subsequent retrofitted speaker enclosure by a normally open relay in series with the two wire daisy-chained analog audio cables.

30. The method according to claim 28, further comprising:
receiving a second command at the first retrofitted speaker enclosure to close the normally open relay in series with the two wire daisy-chained analog audio cables;
receiving a third command at the second retrofitted speaker enclosure to report an identification number of the second retrofitted speaker enclosure;
transmitting a second response to the third command that includes at least the second identification number of the second retrofitted speaker enclosure;
receiving a second data path test message at the second retrofitted speaker enclosure;
determining a data through-put rate for a second path that comprises the first path plus a path from the first retrofitted speaker enclosure to the second retrofitted speaker enclosure, and storing the same based on the second identification number.

31. The method according to claim 30, further comprising:
repeating the steps of transmitting commands to close normally open relays, determining an identification number of a next subsequent speaker enclosure, determining a respective data throughput rate from the commissioning computer to the next subsequent speaker enclosure, and storing the respective data throughput rate based on the respective retrofitted speaker enclosure identification number until all of the retrofitted speaker enclosures have been tested for their respective data throughput rates.

32. The method according to claim 31, further comprising:
generating a table that lists retrofitted speaker enclosures versus respective data throughput rates; and
applying a compression algorithm to the digitally encoded audio signals and digital command signals that increases the compression of the digitally encoded audio signals and digital command signals in direct proportion to the data throughput rate to the respective retrofitted speaker enclosures that the digitally encoded audio signals and digital command signals are being directed to.

33. The method according to claim 28, further comprising:
receiving audio signals by at least one microphone in two or more retrofitted speaker enclosures, and converting the same to an analog audio signal;
converting the received analog audio signal into a return digital audio signal; and
processing the return digital audio signal to perform one or more of
(a) determining if an audio signal is being broadcast as intended,
(b) determining a quality of the broadcast audio signal, wherein the quality includes one or more distortion levels, frequency response, and sound pressure levels,
(c) providing full duplex intercom,
(d) performing gunshot detection,
(e) performing acoustic echo cancellation, and
(f) performing ambient noise compensation.

34. The method according to claim 33, further comprising:
adding a time-date stamp to the return digital audio signal, such that a commissioning computer can be adapted to determine which of a plurality of retrofitted speaker enclosures first received the analog audio signal.

35. A method for commissioning two or more retrofitted speaker enclosures in a retrofit digital speaker system, the method comprising:
daisy-chain connecting each of the two or more retrofitted speaker enclosures using two wire analog audio cables;
transmitting digitally encoded audio signals, electrical power, and digital command signals over the daisy-chained two wire analog audio cables;
receiving digitally encoded audio signals, electrical power, and digital command signals at an analog-and-digital interface in a first retrofitted speaker enclosure;
receiving audio signals by at least one microphone in two or more retrofitted speaker enclosures, and converting the same to an analog audio signal;
converting the received analog audio signal into a return digital audio signal; and
processing the return digital audio signal to perform one or more of
(a) determining if an audio signal is being broadcast as intended,
(b) determining a quality of the broadcast audio signal, wherein the quality includes one or more distortion levels, frequency response, and sound pressure levels,
(c) providing full duplex intercom,
(d) performing gunshot detection,
(e) performing acoustic echo cancellation, and
(f) performing ambient noise compensation.

36. The method according to claim 35, further comprising:
preventing the received digitally encoded audio signals, electrical power, and digital command signals from being transmitted to a second or subsequent retrofitted speaker enclosure by a normally open relay in series with the two wire daisy-chained analog audio cables.

37. The method according to claim 35, further comprising:
receiving a first command at the first retrofitted speaker enclosure to report an identification number of the first retrofitted speaker enclosure;
transmitting a first response to the first command that includes at least the first identification number of the first retrofitted speaker enclosure;
receiving a first data path test message at the first retrofitted speaker enclosure; and
determining a data through-put rate for a first path that comprises the path from a commissioning computer to the first retrofitted speaker enclosure, and storing the same based on the first identification number.

38. The method according to claim 35, further comprising:
receiving a second command at the first retrofitted speaker enclosure to close the normally open relay in series with the two wire daisy-chained analog audio cables;
receiving a third command at the second retrofitted speaker enclosure to report an identification number of the second retrofitted speaker enclosure;
transmitting a second response to the third command that includes at least the second identification number of the second retrofitted speaker enclosure;
receiving a second data path test message at the second retrofitted speaker enclosure;
determining a data through-put rate for a second path that comprises the first path plus a path from the first retrofitted speaker enclosure to the second retrofitted speaker enclosure, and storing the same based on the second identification number.

39. The method according to claim 38, further comprising:
repeating the steps of transmitting commands to close normally open relays, determining an identification number of a next subsequent speaker enclosure, determining a respective data throughput rate from the commissioning computer to the next subsequent speaker enclosure, and storing the respective data throughput rate based on the respective retrofitted speaker enclosure identification number until all of the retrofitted speaker enclosures have been tested for their respective data throughput rates.

40. The method according to claim 39, further comprising:
generating a table that lists retrofitted speaker enclosures versus respective data throughput rates; and applying a compression algorithm to the digitally encoded audio signals and digital command signals that increases the compression of the digitally encoded audio signals and digital command signals in direct proportion to the data throughput rate to the respective retrofitted speaker enclosures that the digitally encoded audio signals and digital command signals are being directed to.

41. The method according to claim 35, further comprising:

adding a time-date stamp to the return digital audio signal, such that a commissioning computer can be adapted to determine which of a plurality of retrofitted speaker enclosures first received the analog audio signal.

\* \* \* \* \*